(12) United States Patent
Sato

(10) Patent No.: US 8,684,215 B2
(45) Date of Patent: Apr. 1, 2014

(54) FUEL CAP

(71) Applicant: Toyoda Gosei Co., Ltd., Kiyosu (JP)

(72) Inventor: Hiroyuki Sato, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/659,078

(22) Filed: Oct. 24, 2012

(65) Prior Publication Data

US 2013/0105479 A1 May 2, 2013

(30) Foreign Application Priority Data

Oct. 28, 2011 (JP) ................................. 2011-236742

(51) Int. Cl.
*B65D 51/16* (2006.01)
(52) U.S. Cl.
USPC ................ 220/303; 220/203.23; 220/203.24; 220/203.26; 220/203.28; 220/304; 220/DIG. 33

(58) Field of Classification Search
USPC ............. 220/203.23, 203.24, 230.26, 230.28, 220/303, DIG. 33
See application file for complete search history.

(56) References Cited

U.S. PATENT DOCUMENTS 7,578,405 B2   8/2009   Hagano

FOREIGN PATENT DOCUMENTS

JP        2005-81862 A      3/2005

*Primary Examiner* — Anthony Stashick
*Assistant Examiner* — Elizabeth Volz
(74) *Attorney, Agent, or Firm* — Posz Law Group, PLC

(57) ABSTRACT

The pressure control valve comprises a negative pressure valve and a positive pressure valve. The negative pressure valve comprises a negative pressure valve body, a valve retaining member and an engagement mechanism. The engagement mechanism comprises a support concave portion formed on the negative pressure valve body and a support protrusion formed on the valve retaining member and inserted into the support concave portion, which is formed to reduce the elastic deformation transferred to a second seating portion, when a first seating portion is pressed by a first seal portion to undergo elastic deformation.

7 Claims, 7 Drawing Sheets

FUEL CAP

This application claims the benefit of and priority from Japanese Application No. 2011-236742 filed Oct. 28, 2011, the content of which is incorporated herein by reference.

BACKGROUND OF THE INVENTION

1. Field of the Invention

This invention relates to a fuel cap having a pressure control valve that controls the pressure within a fuel tank.

2. Description of the Related Art

A fuel cap is disclosed in JP-A 2005-81862. The fuel cap is provided with a cap main body that is screwed onto an inlet of a fuel tank and a pressure control valve attached to the cap main body that controls the pressure within the fuel tank. The pressure control valve, comprising a plurality of valve bodies having positive and negative pressure valves, controls the pressure inside the tank within a specified range by having the positive valve open when the pressure inside the tank exceeds a specified value and the negative valve open when the pressure drops below the value. The valve body of the pressure control valve delivers enhanced sealing performance by being made of rubber. On the valve body, two seating portions are provided side by side on the same seating surface where the seal portions of the positive and negative pressure valves are respectively seated or disseated.

In such pressure control valve, if a sizable elastic deformation occurs at the seating portion of the valve body made of rubber, the deformation may be transferred to the other adjacent seating portion to impair the sealing performance. The elastic deformation of the seating portion of the valve body has a significant impact especially on the pressure control valve with specifications that require a high valve-opening pressure.

SUMMARY

An advantage of some aspects of the invention is to provide a fuel cap having a pressure control valve that does not impair the sealing performance of one seating portion among a plurality of seating portions arranged adjacent to a flexible valve body, even if the other seating portion is pressed thereby and elastically deformed by the seal portion.

According to an aspect of the invention, the invention is to provide a fuel cap that opens and closes a tank opening of a fuel tank, the fuel cap comprises: a cap main body to be mounted to the tank opening of the fuel tank, a first valve mechanism, disposed within the cap main body, that includes a first valve passage, and a first seal portion provided to face the first valve passage, and a first valve body, formed with a flexible material, that opens and closes the first valve passage, a valve retaining member that supports the first valve body, and an engagement mechanism engaging the first valve body to the valve retaining member, and a second valve mechanism, disposed within the cap main body, that includes a second valve passage, and a second valve body having a second seal portion provided to face the second valve passage. The first valve body includes a seating surface provided to face the first seal portion and the second seal portion, a first seating portion, formed on the seating surface, that opens and closes the first valve passage by seating on and disseating from the first seal portion, and a second seating portion, formed on the seating surface and arranged adjacent to the first seating portion, that opens and closes the second valve passage by seating on and disseating from the second seal portion, the valve retaining member includes a support surface, wherein the support surface supports the first valve body by coming in contact with a supported surface located opposite the seating surface, and the engagement mechanism includes a support concave portion and a support protrusion inserted into the support concave portion. The support concave portion and a support protrusion are formed on the supported surface and the support surface respectively, disposed between the first seating portion and second seating portion, so as to reduce elastic deformation transferred from one of the first and second seating portions to the other when one of the first and second seating portions are pressed by the first seal portion and the second seal portion respectively.

In the application example, when the pressure inside the fuel tank rises beyond a specified range in a first valve mechanism and a second valve mechanism, and a first or a second valve body is disseated from a first or a second seal portion to open a first or a second valve passage, the inside of the fuel tank is communicated with the outside via the first or second valve passage to control the pressure inside the fuel tank within a specified range. Then, when the pressure against the first valve body increases to heighten the force whereby the first seating portion of the first valve body is pressed by a first seal portion, the elastic deformation of the first seating portion increases. However, an engagement mechanism reduces an impact of such elastic deformation of the first seating portion on the second seal portion. In other words, the engagement mechanism, located where the first valve body abuts against a valve retaining member and formed between the first and second seating portions, comprises a retaining concave formed on one of the first valve body and the valve retaining member and a retaining protrusion formed on the other of the first valve body and the valve retaining member to be inserted into the retaining concave. When one of the first and second seating portions is pressed and elastically deformed by the first or second seal portion, elastic deformation of the other of the first and second seating portions is reduced. In other words, the engagement mechanism interrupts the elastic deformation generated around the first seating portion to prevent it from being transferred to the second seating portion, thus avoiding any impairment of the sealing performance of the second seating portion.

The fuel cap comprises the first valve body includes a first flexion depression and a second flexion depression. The first flexion depression is formed on the supported surface at a position pressed by the first seating portion, so as to allow the first seating portion to elastically deform toward the valve retaining member when the first seating portion is pressed by the first seal portion, and the second flexion depression is formed on the supported surface at a position pressed by the second seal portion, so as to allow the second seating portion to elastically deform toward the valve retaining member when the second seating portion is pressed by the second seal portion. In this configuration, when the first seating portion abuts against the first seal portion, the first flexion depression is formed to make the first valve body thinner so that it follows the contour of the first seal portion, thus enhancing the sealing performance. Then, even if the first and second seating portions are thin, deterioration of the sealing performance can be prevented since the engagement mechanism reduces the elastic deformation transferred from the first seating portion to the second seating portion.

The fuel cap may comprises the first valve mechanism is a negative pressure valve, and the second valve mechanism is a positive pressure valve.

These and other objects, features, aspects, and advantages of the present invention will become more apparent from the following detailed description of the preferred embodiments with the accompanying drawings.

DESCRIPTION OF THE PREFERRED EMBODIMENTS (1) Schematic Configuration of the Fuel Cap 10

Figure 1:
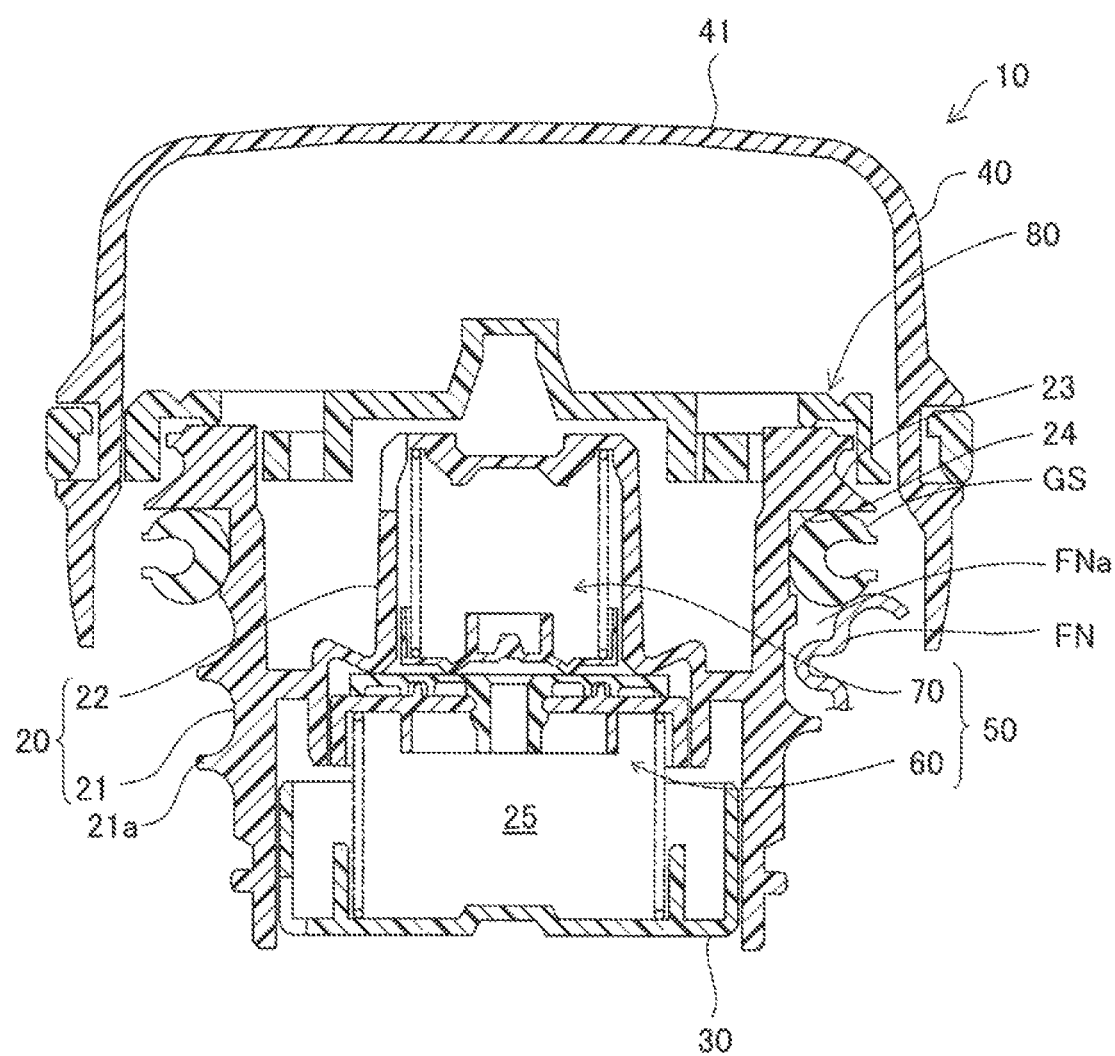
FIG. 1 is a cross section showing the fuel cap according to the first embodiment of the present invention.

FIG. 1 is a cross section showing a fuel cap 10 according to a first embodiment of the present invention. In FIG. 1, the fuel cap 10 is mounted to a filler neck FN having an inlet (a tank opening) FNa for supplying fuel to a fuel tank (not shown) and comprises a cap main body 20 formed with a synthetic resin material such as polyacetal, a bottom lid 30 that forms a valve chamber 25 by closing the lower opening of the cap main body 20, a cover 40 having an operation portion 41 formed with a synthetic resin material such as nylon mounted to the upper part of the cap main body 20, a pressure control valve 50 stored in the valve chamber 25, a torque mechanism 80, and a gasket GS mounted to the upper part of the outer periphery of the cap main body 20 that seals the gap with the filler neck FN.

Figure 2:
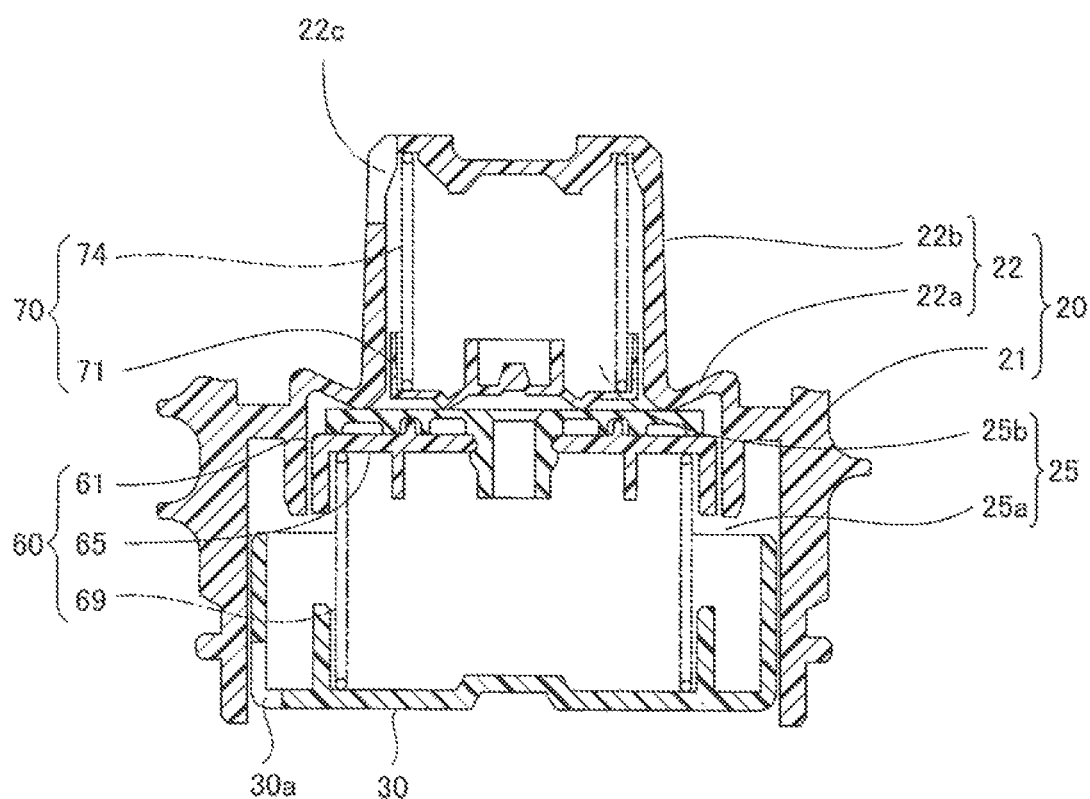
FIG. 2 is a cross section showing the surroundings of the pressure control valve.

The cap main body 20 comprises an outer tube body 21 in an approximate shape of a cylinder having a cap engagement portion 21a that is to be engaged with the inner periphery of the filler neck FN, and a valve chamber forming body 22 provided upward from around the middle of the inner wall of the outer tube body 21. FIG. 2 is a cross section showing the surroundings of the pressure control valve 50. The valve chamber forming body 22 comprises a partition wall 22a that is provided protruded from the middle in height of the outer tube body 21 toward the center thereof, and an storing portion 22b formed upward from the partition wall 22a in a cup shape opening downward. The valve chamber 25 is divided into a lower chamber 25a and an upper chamber 25b by the outer tube body 21 and the valve chamber forming body 22. The lower chamber 25a is connected to the fuel tank via a communication hole 30a formed on the bottom lid 30. The upper chamber 25b is connected to the outside via a communication hole 22c formed in the storing portion 22b. A negative pressure valve 60 (first valve mechanism) and a positive pressure valve 70 (second valve mechanism) constituting a pressure control valve 50 are stored in the lower chamber 25a and the upper chamber 25 be, respectively, to control the pressure in the fuel tank within a specified range.

In FIG. 1, a gasket GS is mounted outside on the bottom surface of the flange 23 in the upper part of the cap main body 20. The gasket GS, interposed between a seal retainer 24 and the inlet FNa of the filler neck FN, performs the sealing function by being pressed against the seal retainer 24 and the inlet FNa. At this time, the operator feels a click when the action of closing the fuel cap 10 using the torque mechanism exceeds a specified rotational torque, thus allowing to confirm that the fuel cap is being screwed at a higher torque than specified.

(2) Configuration of the Pressure Control Valve 50

(2)-1 Configuration of the Negative Pressure Valve 60

Figure 3:
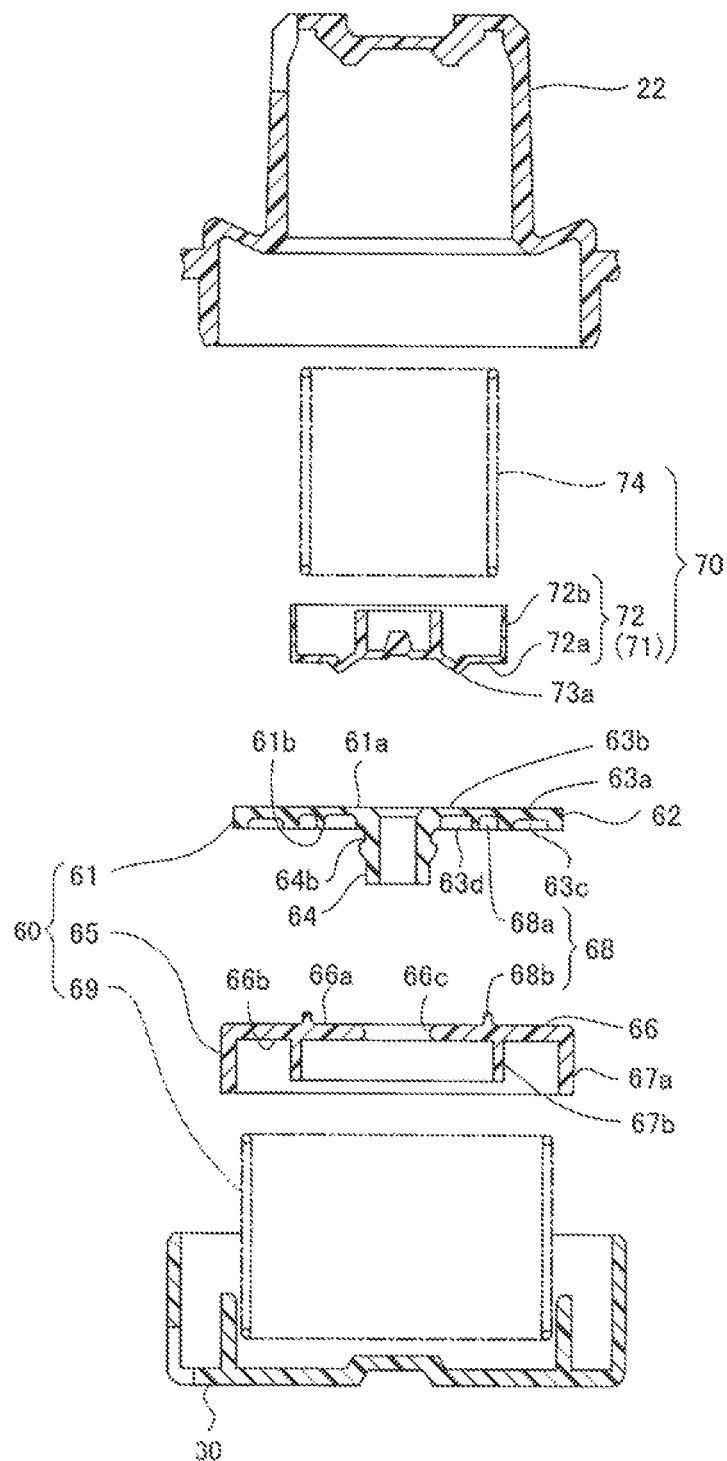
FIG. 3 is an exploded cross section of the pressure control valve.

FIG. 3 is an exploded cross section of the pressure control valve 50. The negative pressure valve 60 comprises a negative pressure valve body 61 (first valve body), a valve retaining member 65 that retains the negative pressure valve body 61, and a first spring 69 extending between the valve retaining member 65 and the bottom lid 30 to energize the negative pressure valve body 61 in the closing direction. The negative pressure valve body 61 comprises a negative pressure valve main body 62 formed in a disc shape with a flexible material such as fluorine-containing rubber and a joint portion 64 provided protruded at the center of the negative pressure valve main body 62, which are integrally formed together. A through hole and protrusions are formed in the negative pressure valve body 61 to ensure the valve functions. In other words, the negative pressure valve body 61 comprises a first seating portion 63a and a second seating portion 63b on a seating surface 61a, which is the upper surface thereof. The first seating portion 63a is provided in a circular shape on the seating surface 61a. The second seating portion 63b, located on the inner peripheral side of the first seating portion 63a, is provided in a concentric manner on the seating surface 61a. Then, a first flexion depression 63c and a second flexion depression 63d are formed on a supported surface 61b, which is opposite the seating surface 61a of the negative pressure valve body 61. The first and second depressions for flexion 63c and 63d are positioned corresponding to the first and second seating portions 63a and 63b, respectively, and the thicknesses of the depressed portions are made smaller than other portions. The joint portion 64 is provided protruded in an approximate shape of a cylinder from the middle of the negative pressure valve body 62 downward as shown in the figure, while a side supporting depression 64b is formed along the side of the joint portion 64.

The valve retaining member 65 is a member in a disc shape that supports the negative pressure valve body 61 by abutting against the supported surface 61b of the negative pressure valve body 61, and is formed with resin with high mechanical strength. The valve retaining member 65 comprises a support main body 66 in a disc shape, a side wall 67a in a cylindrical shape provided protruded from the outer periphery of the support main body 66, and a reinforcing wall 67b provided protruded on the inner peripheral side of the side wall 67a. The support main body 66 comprises a support surface 66a that abuts against and supports the supported surface 61b of the negative pressure valve body 61, a spring support portion 66b that supports one end of the first spring 69, and a support hole 66c. The support hole 66c, formed in the middle of the negative pressure valve body 61, fits the negative pressure valve body 61 into the valve retaining member 65 by insertion.

Figure 4:
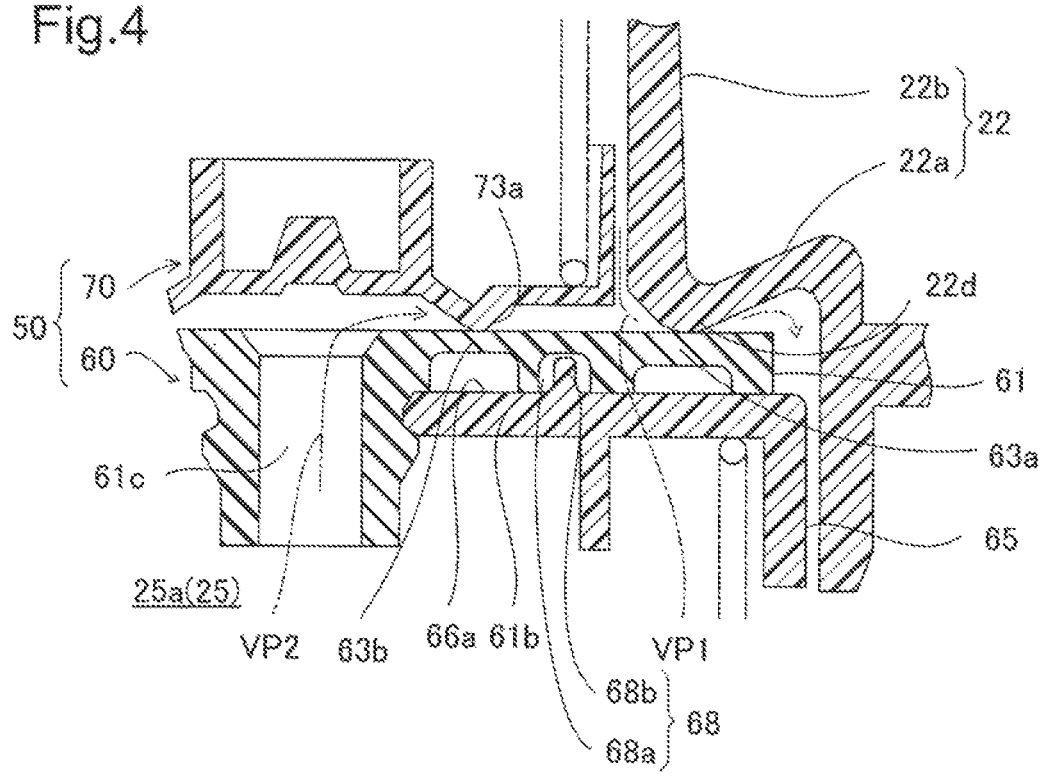
FIG. 4 is a cross section showing the main portion of the pressure control valve.

FIG. 4 is a cross section showing the main portion of the pressure control valve 50. At the location where the negative pressure valve body 61 and the valve retaining member 65 are abutting against each other, an engagement mechanism 68 is provided. The engagement mechanism 68 is formed all along the circumference between the first seating portion 63a and the second seating portion 63b, and comprises a support concave portion 68a formed on the supported surface 61b and a support protrusion 68b provided protruded from the support surface 66a of the valve retaining member 65. The support protrusion 68b is inserted into the support concave portion 68a of the negative pressure valve body 61. Also, the valve passage of the negative pressure valve 60 is configured as follows: A first seal portion 22d is formed at the tip of the slope where the partition wall 22a and the storing portion 22b are jointed. By having the first seating portion 63a of the negative pressure valve body 61 seated or disseated, the first seal portion 22d opens and closes a first valve passage VP1 between them.

In FIG. 3, the positive pressure valve 70 comprises a positive pressure valve body 71 (second valve body) made of resin and a second spring 74 extending between the positive pressure valve body 71 and the bottom of the storing portion 22b to energize the positive pressure valve body 71. The positive pressure valve body 71 comprises a positive pressure valve main body 72 in a cup shape formed with a seating plate 72a and a side wall 72b in a cylindrical shape provided protruded from the outer periphery of the seating plate 72a, and protrusions and the like to ensure the valve functions are formed on the positive pressure valve main body 72. In other words, on the seating plate 72a of the positive pressure valve main body 72, a second seal portion 73a is formed in a round mound shape that is to be seated on the second seating portion 63b of the negative pressure valve body 61. Now, the valve passage of the positive pressure valve 70 is configured as follows: In FIG. 4, by being seated on or disseated from the second seating portion 63b of the negative pressure valve body 61, the second seal portion 73a opens and closes a second valve passage VP2 between them. The second valve passage VP2 is connected to the fuel tank via the lower chamber 25a of the valve chamber 25 by being connected to a communication channel 61c that passes through the center of the negative pressure valve body 61.

(3) Action of the Pressure Control Valve 50

Figure 5:
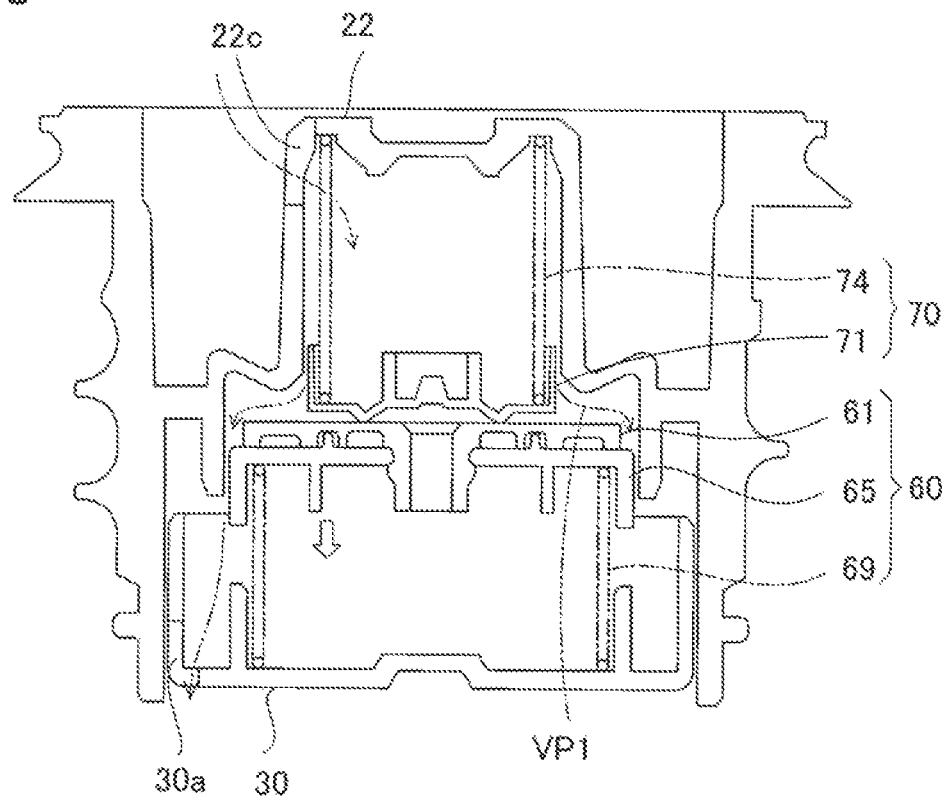
FIG. 5 shows a negative valve-opening action of the pressure control valve.

In the configuration, the pressure control within the fuel tank by the negative pressure valve 60 is performed by the following actions: Under the condition where the fuel cap 10 shown in FIG. 1 is mounted to the filler neck FN, when the pressure within the fuel tank becomes a negative pressure exceeding the first pressure value, the negative pressure valve body 61 and the valve retaining member 65 drops down working against the energized force of the first spring as shown in FIG. 5. This allows the open air to communicate with the fuel tank via the gap along the outer periphery of the negative pressure valve body 61 and the communication hole 30a of the bottom lid 30 to flow in the direction of offsetting the negative pressure within the fuel tank. Meanwhile, when the negative pressure valve 60 is open, the positive pressure valve 70 drops down together with the negative pressure valve body 61 since the positive pressure valve body 71 of the positive pressure valve 70 is energized by the second spring 74.

Figure 6:
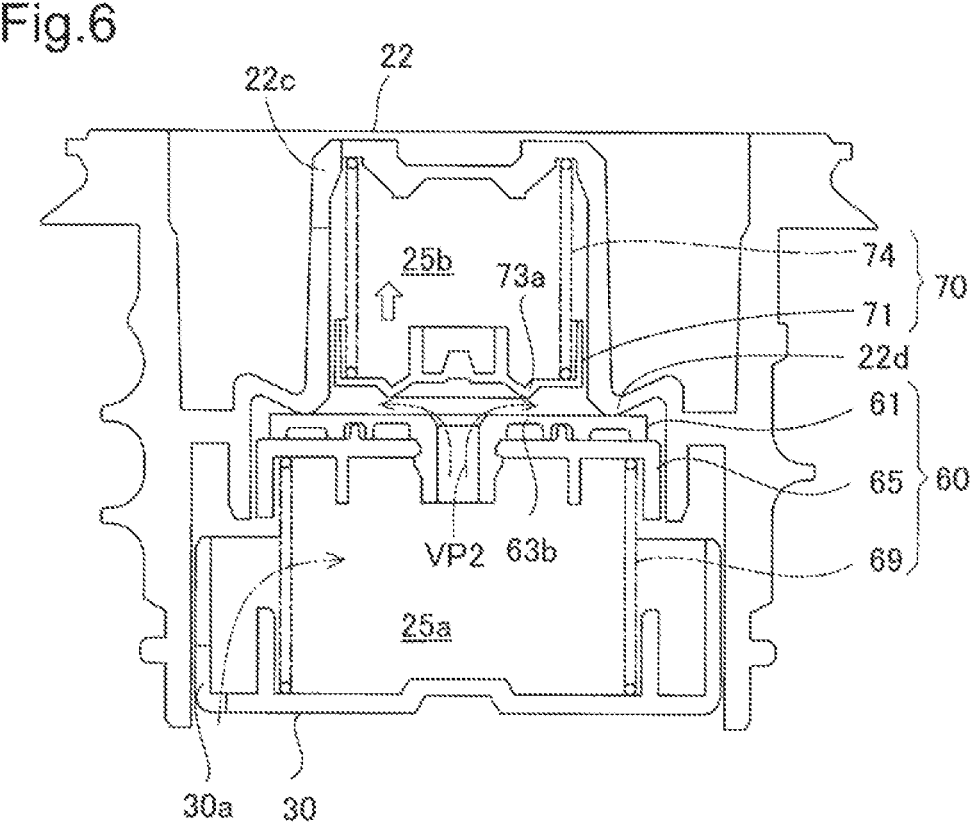
FIG. 6 shows a positive valve-opening action of the pressure control valve.

On the contrary, when the pressure inside the tank turns positive exceeding a second pressure value, the positive pressure valve body 71 moves upward, as shown in FIG. 6, against the energized force of the second spring 74 so as to separate the second seal portion 73a of the positive pressure valve body 71 from the second seating portion 63b of the negative pressure valve body 61. At this time, the negative pressure valve body 61 is seated on the first seal portion 22d and the second valve passage VP2 between the positive pressure valve body 71 and the negative pressure valve body 61 is opened to maintain the status quo. This allows the open air to communicate with the fuel tank via the communication hole 30a of the bottom lid 30, the lower chamber 25a, the upper chamber 25b, and the communication hole 22c of the valve chamber forming body 22, thus offsetting the positive pressure inside the fuel tank.

(4) Actions and Effects of the Pressure Control Valve 50

Figure 7:
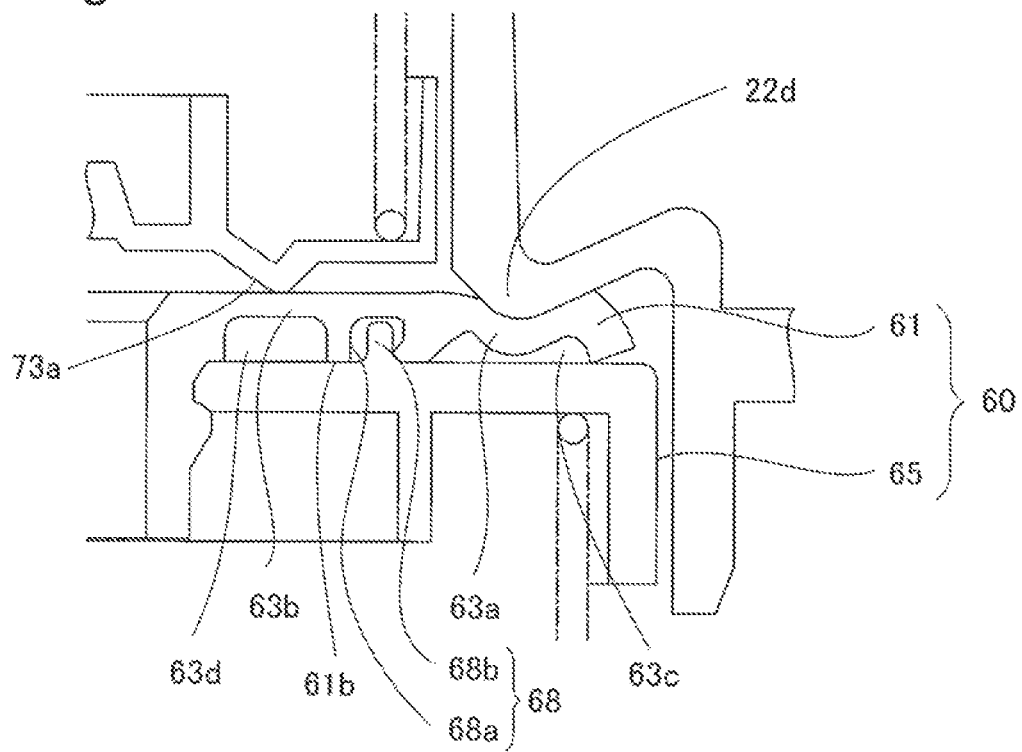
FIG. 7 shows a mechanism of the pressure control valve.

The configuration of the embodiment exerts the following actions and effects:

(4)-1 As shown in FIG. 7, when the pressure inside the fuel tank heightens to increase the upward force applied to the negative pressure valve body 61, the first seating portion 63a of the negative pressure valve body 61 is pressed at where it is seated on the first seal portion 22d to cause significant elastic deformation. On the side of the valve retaining member 65 between the first and second seating portions 63a and 63b, the engagement mechanism 68 is formed. The engagement mechanism 68, located where the negative pressure valve body 61 abuts against the valve retaining member 65, is formed between the first and second seating portions 63a and 63b, and comprises the support concave portion 68a and the support protrusion 68b formed on the valve retaining member 65 and inserted into the support concave portion 68a, which are engaged with each other. This reduces the elastic deformation of the second seating portion 63b when the first seating portion 63 is pressed by the first seal portion 22d to undergo elastic deformation. In other words, the engagement mechanism 68 works against the elastic deformation generated around the first seating portion 63a and prevents it from being transferred to the second seating portion 63b, thus avoiding the impairment of the sealing performance by the second seating portion 63b. Moreover, since the engagement mechanism 68 has the support protrusion 68b of the valve retaining member 65 formed with resin less expansive than rubber, it does not fail to perform its functions even if the negative pressure valve body 61 made of rubber is expanded since it remains securely inserted in the support concave portion 68a.

(4)-2 As shown in FIG. 7, the negative pressure valve body 61 has the first flexion depression 63c and the second seating portion 63b at a position corresponding to the first seating portion 63a and the second seating position 63b, and the first and second seating portions 63a and 63b are made thinner than other portions. For this reason, the first and second seating portions 63a and 63b achieve high sealing performance since they follow the contours of the first and second seal portions 22d and 73a. Thus, the engagement mechanism 68 reduces the elastic deformation transferred from the first seating portion 63a to the second seating portion 63b even if the first and second seating portions 63a and 63b are made thinner, thus preventing reduction in the sealing performance.

(5) Other Embodiments

Figure 8:
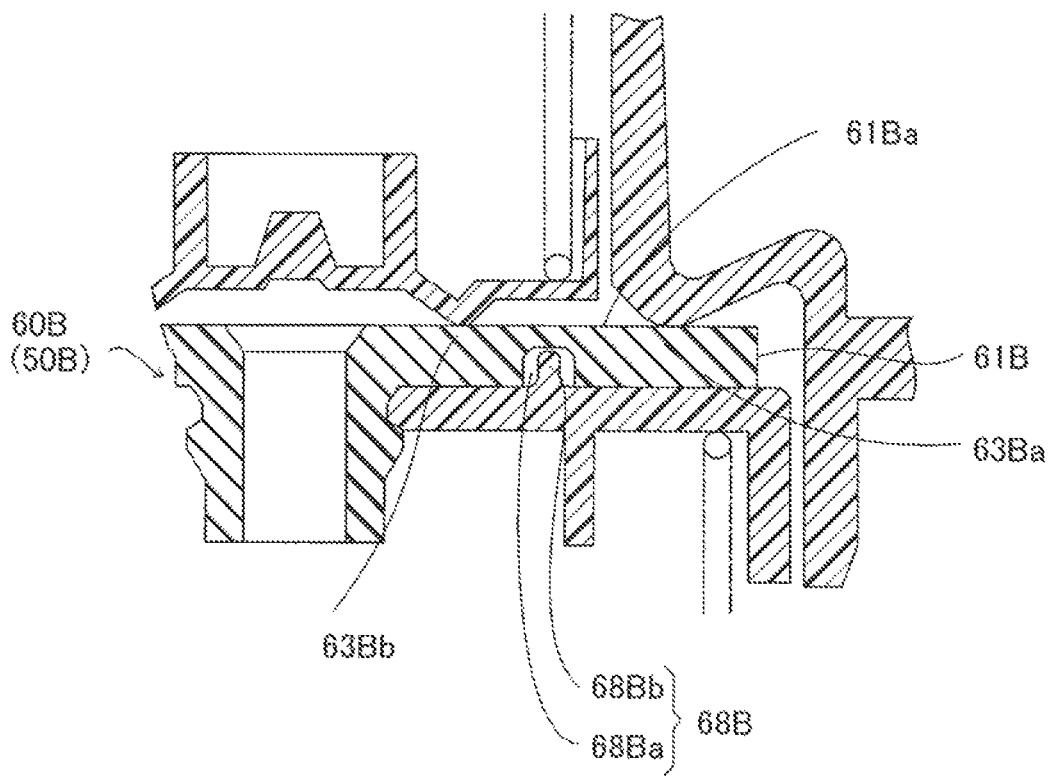
FIG. 8 is a cross section showing the main portion of the pressure control valve according to a second embodiment.

The present invention is not limited to the embodiments, but is implementable in various aspects within the range not to deviate from the scope thereof, and the following variation is also possible:

(5)-1 FIG. 8 is a cross section showing the main portion of the pressure control valve 50B according to a second embodiment. This embodiment is characterized by the shape of the negative pressure valve body 61B of the negative pressure valve 60B. That is, the negative pressure valve body 61B is provided with a first seating portion 63Ba and a second seating portion 63Bb. The first and second seating portions 63Ba and 63Bb are provided with no depression for flexion on the rear side with the same thickness as that of the surroundings. Thus, even if the first and second seating portions 63Ba and 63Bb do not have any depression for flexion on the rear side, an engagement mechanism 68B interrupts the elastic deformation of the first seating portion 63Ba to avoid an impact on the second seating portion 63Bb.

Figure 9:
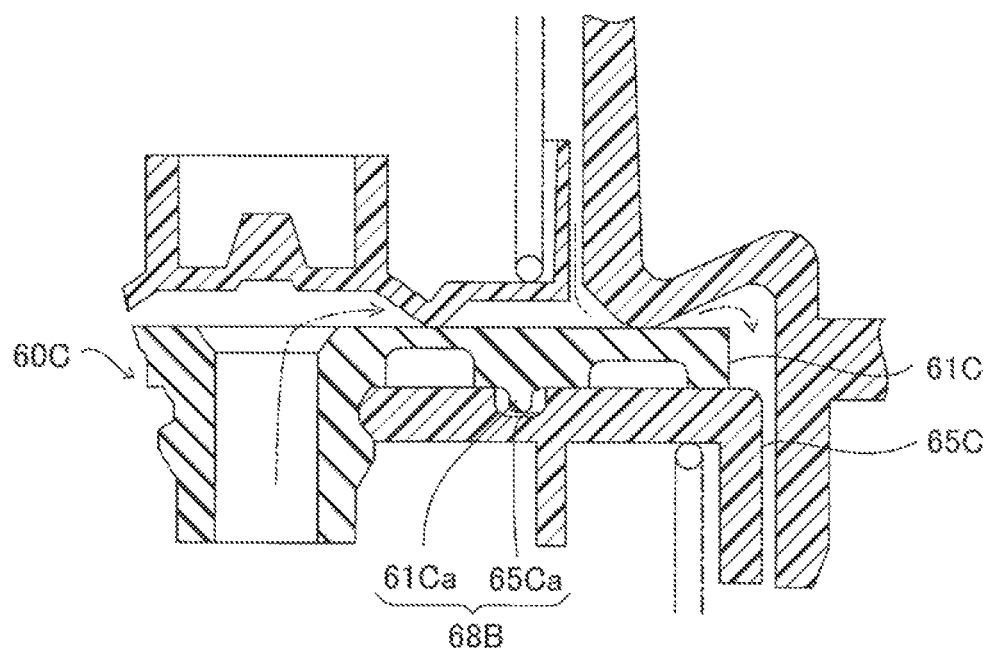
FIG. 9 is a cross section showing the main portion of the pressure control valve according to a third embodiment.

(5)-2 The engagement mechanism of the embodiment is explained as a configuration where the support concave portion 68a is provided to the negative pressure valve body 61 and the support protrusion 68b is provided to the valve retaining member 65, but in addition, it can be another configuration. FIG. 9 is a cross section showing the main portion of the pressure control valve according to a third embodiment. A engagement mechanism 68C can also be configured where a support protrusion 61Ca is provided to a pressure valve body 61C and a support concave portion 65Ca is provided to the valve retaining member 65C to be engaged with each other.

(5)-3 In the embodiment, a configuration where the engagement mechanism is provided to the negative pressure valve was explained, but in addition, the engagement mechanism can also be provided to the positive pressure vale to exert the same effect as long as the configuration reduces the elastic deformation of the flexible valve body.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A fuel cap that opens and closes a tank opening of a fuel tank, the fuel cap comprising:
    a cap main body to be mounted to the tank opening of the fuel tank,
    a first valve mechanism disposed within the cap main body, the first valve mechanism including (i) a first valve passage; (ii) a first seal portion provided to face the first valve passage; (iii) a first valve body that is formed with a flexible material and opens and closes the first valve passage; (iv) a valve retaining member that supports the first valve body; and (v) an engagement mechanism engaging the first valve body to the valve retaining member, and
    a second valve mechanism disposed within the cap main body, the second valve mechanism including (i) a second valve passage; and (ii) a second valve body having a second seal portion provided to face the second valve passage,
    wherein the first valve body includes: (i) a seating surface provided to face the first seal portion and the second seal portion, (ii) a first seating portion that is formed on the seating surface and opens and closes the first valve passage by seating on and disseating from the first seal portion, and (iii) a second seating portion that is formed on the seating surface and arranged adjacent to the first seating portion, and opens and closes the second valve passage by seating on and disseating from the second seal portion,
    the valve retaining member includes a support surface that the support surface supports the first valve body by coming in contact with a supported surface located opposite the seating surface, and
    the engagement mechanism includes a support concave portion and a support protrusion inserted into the support concave portion, wherein
    the support concave portion and the support protrusion are formed on the supported surface and the support surface respectively, disposed between the first seating portion and second seating portion, so as to reduce elastic deformation transferred from one of the first and second seating portions to the other when one of the first and second seating portions are pressed by the first seal portion and the second seal portion respectively.

2. The fuel cap in accordance with claim 1, wherein the support concave portion is formed on the first valve body and the support protrusion is formed on the valve retaining member.

3. The fuel cap in accordance with claim 2, wherein the first valve body includes a first flexion depression and a second flexion depression, wherein
    the first flexion depression is formed on the supported surface at a position pressed by the first seating portion, so as to allow the first seating portion to elastically deform toward the valve retaining member when the first seating portion is pressed by the first seal portion, and
    the second flexion depression is formed on the supported surface at a position pressed by the second seal portion, so as to allow the second seating portion to elastically deform toward the valve retaining member when the second seating portion is pressed by the second seal portion.

4. The fuel cap in accordance with claim 3, wherein the first valve mechanism is a negative pressure valve, and the second valve mechanism is a positive pressure valve.

5. The fuel cap in accordance with claim 1, wherein the support concave portion is formed on the valve retaining member and the support protrusion is formed on the first valve body.

6. The fuel cap in accordance with claim 5, wherein the first valve body includes a first flexion depression and a second flexion depression, wherein
    the first flexion depression is formed on the supported surface at a position pressed by the first seating portion, so as to allow the first seating portion to elastically deform toward the valve retaining member when the first seating portion is pressed by the first seal portion, and
    the second flexion depression is formed on the supported surface at a position pressed by the second seal portion, so as to allow the second seating portion to elastically deform toward the valve retaining member when the second seating portion is pressed by the second seal portion.

7. The fuel cap in accordance with claim 6, wherein, the first valve mechanism is a negative pressure valve, and the second valve mechanism is a positive pressure valve.

* * * * *